United States Patent
Newlin et al.

(10) Patent No.: US 11,846,548 B2
(45) Date of Patent: Dec. 19, 2023

(54) PROTECTIVE SLEEVES FOR FIRE AND OVERHEAT DETECTION SYSTEMS FOR AIRCRAFT APPLICATIONS

(71) Applicant: Kidde Technologies, Inc., Wilson, NC (US)

(72) Inventors: Scott Kenneth Newlin, Willow Spring, NC (US); Steven Wallace, Raleigh, NC (US); Albert Chad Rouse, Prior Lake, MN (US)

(73) Assignee: KIDDE TECHNOLOGIES, INC., Wilson, NC (US)

(*) Notice: Subject to any disclaimer, the term of this patent is extended or adjusted under 35 U.S.C. 154(b) by 479 days.

(21) Appl. No.: 17/202,605

(22) Filed: Mar. 16, 2021

(65) Prior Publication Data
US 2022/0299376 A1 Sep. 22, 2022

(51) Int. Cl.
*G01K 1/12* (2006.01)
*A62C 37/36* (2006.01)
*A62C 3/08* (2006.01)
*G01D 11/24* (2006.01)

(52) U.S. Cl.
CPC ............... *G01K 1/12* (2013.01); *A62C 37/36* (2013.01); *A62C 3/08* (2013.01); *G01D 11/245* (2013.01)

(58) Field of Classification Search
None
See application file for complete search history.

(56) References Cited

U.S. PATENT DOCUMENTS

| | | | |
|---|---|---|---|
| 2,487,526 A | 11/1949 | Dahm et al. | |
| 3,639,788 A * | 2/1972 | Horan | H02N 2/183 310/319 |
| 4,418,329 A | 11/1983 | Gruner | |
| 5,137,478 A | 8/1992 | Graf et al. | |
| 5,886,294 A | 3/1999 | Scrimpshire et al. | |
| 5,887,822 A * | 3/1999 | Thornock | B64D 33/04 244/54 |
| 5,906,097 A * | 5/1999 | Hebert | B64D 29/02 244/54 |

(Continued)

FOREIGN PATENT DOCUMENTS

EP 0464303 A2 1/1992

OTHER PUBLICATIONS

European Search Report for European Application No. 22160548.8; dated Aug. 22, 2022; 8 pages.

*Primary Examiner* — Fekadeselassie Girma
(74) *Attorney, Agent, or Firm* — CANTOR COLBURN LLP

(57) ABSTRACT

Aircraft fire and overheat detection systems are described. The systems include a support bracket configured to secure the system to a component of an aircraft. A terminal assembly is fixedly connected to the support bracket and includes a connection assembly and a connection cable. A sensing element is electrically connected to the terminal assembly and arranged to detect at least one of fire and heat associated with the component of the aircraft. A protective sleeve is arranged about the connection assembly and connection cable. The sleeve has a lug portion at a first end with a sealing protrusion extending radially inward, a first wire portion, and a second wire portion, with progressively smaller diameters for each portion.

20 Claims, 3 Drawing Sheets

(56) References Cited

U.S. PATENT DOCUMENTS

| | | | | |
|---|---|---|---|---|
| 5,970,951 | A * | 10/1999 | Ito | F02M 35/165 123/333 |
| 9,540,907 | B1 * | 1/2017 | du Plessis | A62C 3/06 |
| 11,338,910 | B2 * | 5/2022 | Rogers | G01K 11/3206 |
| 11,413,484 | B2 * | 8/2022 | Norris | A62C 35/68 |
| 11,416,643 | B2 * | 8/2022 | Daly | G08B 29/18 |
| 11,422,042 | B2 * | 8/2022 | Daly | G01K 1/026 |
| 11,428,579 | B2 * | 8/2022 | Newlin | G01K 1/14 |
| 11,434,076 | B2 * | 9/2022 | Rogers | G05B 15/02 |
| 11,504,559 | B2 * | 11/2022 | Avudaiappan | A62C 3/08 |
| 11,517,778 | B2 * | 12/2022 | Simpson | A62C 3/08 |
| 11,536,154 | B2 * | 12/2022 | Himmelmann | B64D 41/00 |
| 11,623,110 | B2 * | 4/2023 | Jacob | B22F 7/08 219/76.1 |
| 11,682,282 | B2 * | 6/2023 | Jeyapaul | G02B 6/0208 340/630 |
| 11,717,839 | B2 * | 8/2023 | Baldwin | A62C 3/08 169/62 |
| 2011/0080296 | A1 * | 4/2011 | Lance | G08B 17/06 338/25 |
| 2014/0126173 | A1 | 5/2014 | Hutchinson | |
| 2015/0144398 | A1 | 5/2015 | Vaccaro | |
| 2015/0336681 | A1 * | 11/2015 | Kern | F01D 17/085 340/945 |
| 2016/0059057 | A1 * | 3/2016 | Disimile | A62C 31/05 169/46 |
| 2017/0336268 | A1 * | 11/2017 | Wilson | G01K 11/32 |
| 2018/0161793 | A1 * | 6/2018 | Disimile | B64F 5/23 |
| 2019/0172149 | A1 * | 6/2019 | Conboy | C09K 21/00 |
| 2019/0323899 | A1 * | 10/2019 | Merat | G01K 15/007 |
| 2020/0408106 | A1 * | 12/2020 | Karnofski | F01D 23/00 |
| 2021/0017909 | A1 * | 1/2021 | Patil | F02C 7/32 |
| 2021/0038935 | A1 * | 2/2021 | Lakshmi | G01K 3/005 |
| 2021/0172804 | A1 * | 6/2021 | Patil | F16L 3/237 |
| 2021/0262895 | A1 * | 8/2021 | Heinzelmaier | G01N 27/90 |
| 2021/0354831 | A1 * | 11/2021 | Clark | B64C 21/025 |
| 2021/0381901 | A1 * | 12/2021 | Newlin | F16L 3/1075 |
| 2022/0107227 | A1 * | 4/2022 | Varnell | G01K 11/06 |
| 2023/0251142 | A1 * | 8/2023 | Bang | G01K 3/005 374/185 |
| 2023/0264055 | A1 * | 8/2023 | Vallamkondu | A62C 37/11 169/62 |

* cited by examiner

PROTECTIVE SLEEVES FOR FIRE AND OVERHEAT DETECTION SYSTEMS FOR AIRCRAFT APPLICATIONS

BACKGROUND

The present disclosure relates generally to fire and overheat detection systems, and more particularly to protective sleeves for components of fire and overheat detection systems in aircraft applications.

Vehicles, such as aircraft, commonly include fire and overheat detection systems for monitoring spaces within the vehicle for fire and/or overheating. Fire and overheating detection systems generally include thermal detectors and/or other types of sensor elements to provide an indication of elevated temperature and/or of fire events. The thermal detectors and/or sensor elements are typically supported within (or within view) to the space monitored for fire and/or overheating, generally using a mounting structure.

In the case of gas turbine engines, mounting systems typically space the thermal detectors and/or sensor elements away from the engine structure. This allows the thermal detector and/or sensor element to monitors temperature between the engine and the nacelle, avoids the need to directly contact hot surfaces of the engine, and allows the mounting system to dampen vibration communicated to the thermal detector or sensor element from the engine. In some engines the temperature between the engine and the nacelle can rise to above those at which polymeric materials and polytetrafluoroethylene (PTFE) materials change, e.g., becoming brittle or melting, limiting the ability of the mounting system to dampen vibration communicated to the thermal detector and/or sensor element.

BRIEF DESCRIPTION

According to some embodiments, aircraft fire and overheat detection systems are provided. The aircraft fire and overheat detection systems include a support bracket configured to secure the aircraft fire and overheat detection system to a component of an aircraft, a terminal assembly fixedly connected to the support bracket, the terminal assembly comprising a connection assembly and a connection cable, a sensing element electrically connected to the terminal assembly and arranged to detect at least one of fire and heat associated with the component of the aircraft, wherein the connection cable is electrically connected to the sensing element to enable detection of an electrical resistance in the sensing element, and a protective sleeve arranged about the connection assembly and connection cable, the protective sleeve comprising a first end having an opening and a second end having an opening and an interior bore extending between the openings at the first and second ends. A lug portion is arranged at the first end and includes a sealing protrusion extending radially inward within the interior bore, the lug portion having a first diameter, a first wire portion having a second diameter that is less than the first diameter and extending toward the second end, and a second wire portion arranged at the second end, the second wire portion having a third diameter that is less than the second diameter.

In addition to one or more of the features described above, or as an alternative, further embodiments of the aircraft fire and overheat detection systems may include that the protective sleeve is made from at least one of polyolefin, fluoropolymer, polyvinyl chloride (PVC), polychloroprene (neoprene), and silicone elastomer.

In addition to one or more of the features described above, or as an alternative, further embodiments of the aircraft fire and overheat detection systems may include an adhesive sealant applied to a surface of the interior bore.

In addition to one or more of the features described above, or as an alternative, further embodiments of the aircraft fire and overheat detection systems may include that the adhesive sealant is applied at least to the first wire portion.

In addition to one or more of the features described above, or as an alternative, further embodiments of the aircraft fire and overheat detection systems may include that the adhesive sealant is applied at least to the second wire portion.

In addition to one or more of the features described above, or as an alternative, further embodiments of the aircraft fire and overheat detection systems may include that the adhesive sealant is at least one of hot-melt, silicone, elastomer, and epoxy.

In addition to one or more of the features described above, or as an alternative, further embodiments of the aircraft fire and overheat detection systems may include that the terminal assembly includes a mounting nut threaded onto a threaded barrel and a mounting head wherein a portion of the support bracket is secured between the mounting nut and the mounting head.

In addition to one or more of the features described above, or as an alternative, further embodiments of the aircraft fire and overheat detection systems may include that the sealing protrusion sealingly engages between the threaded nut and the portion of the support bracket.

In addition to one or more of the features described above, or as an alternative, further embodiments of the aircraft fire and overheat detection systems may include that the third diameter is less than an external diameter of the connection cable.

In addition to one or more of the features described above, or as an alternative, further embodiments of the aircraft fire and overheat detection systems may include that the second diameter is substantially equal to an external diameter of the connection cable.

In addition to one or more of the features described above, or as an alternative, further embodiments of the aircraft fire and overheat detection systems may include that the protective sleeve comprises a first transition portion defining a tapering diameter between the lug portion and the first wire portion.

In addition to one or more of the features described above, or as an alternative, further embodiments of the aircraft fire and overheat detection systems may include that the protective sleeve comprises a second transition portion defining a tapering diameter between the first wire portion and the second wire portion.

According to some embodiments, aircraft are provided. The aircraft include a fire-protected space and an aircraft fire and overheat detection system. The aircraft fire and overheat detection system includes a support bracket configured to secure the aircraft fire and overheat detection system within the fire-protected space, a terminal assembly fixedly connected to the support bracket, the terminal assembly comprising a connection assembly and a connection cable, a sensing element electrically connected to the terminal assembly and arranged to detect at least one of fire and heat associated with the component of the aircraft, wherein the connection cable is electrically connected to the sensing element to enable detection of an electrical resistance in the sensing element, and a protective sleeve arranged about the connection assembly and connection cable, the protective sleeve comprising a first end having an opening and a second end having an opening and an interior bore extending between the openings at the first and second ends. A lug portion is arranged at the first end and includes a sealing protrusion extending radially inward within the interior bore, the lug portion having a first diameter, a first wire portion having a second diameter that is less than the first diameter and extending toward the second end, and a second wire portion arranged at the second end, the second wire portion having a third diameter that is less than the second diameter.

In addition to one or more of the features described above, or as an alternative, further embodiments of the aircraft may include that the fire protected space is located within a portion of an engine of the aircraft.

In addition to one or more of the features described above, or as an alternative, further embodiments of the aircraft may include that the protective sleeve is made from at least one of polyolefin, fluoropolymer, polyvinyl chloride (PVC), polychloroprene (neoprene), and silicone elastomer.

In addition to one or more of the features described above, or as an alternative, further embodiments of the aircraft may include an adhesive sealant applied to a surface of the interior bore.

In addition to one or more of the features described above, or as an alternative, further embodiments of the aircraft may include that the terminal assembly includes a mounting nut threaded onto a threaded barrel and a mounting head wherein a portion of the support bracket is secured between the mounting nut and the mounting head.

In addition to one or more of the features described above, or as an alternative, further embodiments of the aircraft may include that the third diameter is less than an external diameter of the connection cable.

In addition to one or more of the features described above, or as an alternative, further embodiments of the aircraft may include that the second diameter is substantially equal to an external diameter of the connection cable.

In addition to one or more of the features described above, or as an alternative, further embodiments of the aircraft may include that the protective sleeve comprises a first transition portion defining a tapering diameter between the lug portion and the first wire portion and a second transition portion defining a tapering diameter between the first wire portion and the second wire portion.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
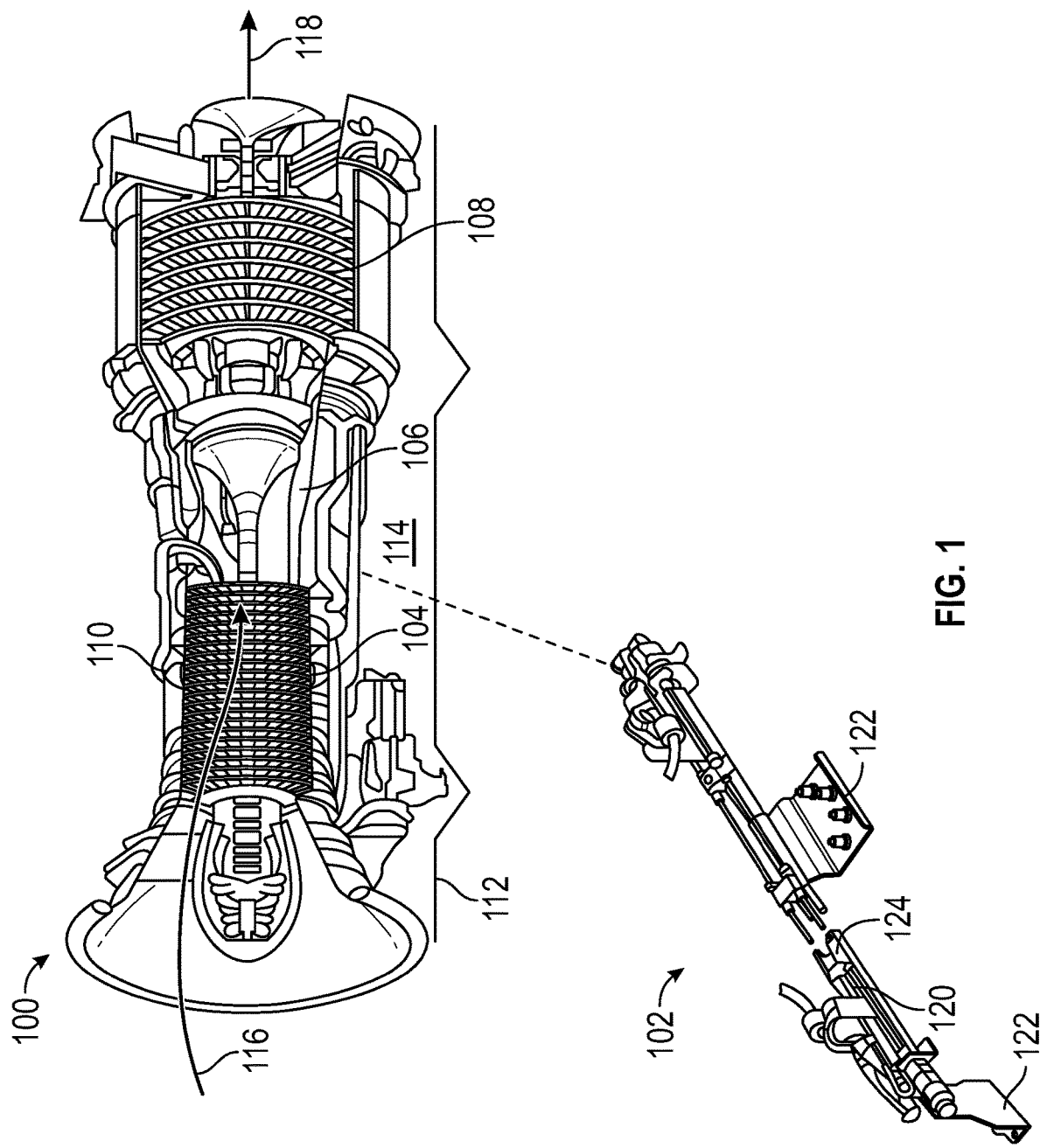
FIG. 1 a schematic view of gas turbine engine that includes a case and has a support arrangement constructed in accordance with the present disclosure attached to the case such that the support arrangement supports a sensor element for a fire and overheat detection system at a location spaced apart from the case.

Reference will now be made to the drawings. For purposes of explanation and illustration, and not limitation, FIG. 1 illustrates a partial view of an example embodiment of a gas turbine engine 100 that incorporates a fire and overheat detection system 102 that may incorporate embodiments of the present disclosure is shown. It will be appreciated that other embodiments of fire and overheat detection systems in accordance with the present disclosure, or aspects thereof, may be implemented without departing from the scope of the present disclosure. The systems described herein can be used for providing improved sensing of sensor elements in fire and overheat detection systems in gas turbines, such as in aircraft.

Referring to FIG. 1, a gas turbine engine 100 is shown. The gas turbine engine 100 includes a compressor 104, a combustor 106, and a turbine 108. The gas turbine engine 100 also includes a case 110, a nacelle 112, and the fire and overheat detection system 102. The nacelle 112 encloses the case 110 and defines therebetween a fire-protected space 114. The case 110 in turn encloses the compressor 104, the combustor 106, and the turbine 108, along with other components of the gas turbine engine 100. The compressor 104 is operably associated with and connected to the turbine 108. The compressor 104 is in fluid communication with an ambient environment and is configured to generate a working fluid flow 116 using work provided by the turbine 108. The combustor 106 is in fluid communication with the compressor 108 and is arranged to generate a high pressure combustion product flow 118 using the working fluid flow 116. The turbine 108 is in fluid communication with the combustor 106 and is arranged to extract work from the high pressure combustion product flow 118 received from the combustor 106, a portion of which the turbine 108 communicates to the compressor 104 as work.

The fire and overheat detector system 102 includes one or more sensor elements 120, one or more support brackets 122, and one or more support rails 124. The support brackets 122 and the support rails 124 may be configured to connecting to and/or mounting to the case 110 of the gas turbine engine 100. In some configurations, the support rails 124 are mounted to the support brackets 122 and the support elements 122, 124 supports the sensor elements 120. The sensor elements 120 may be, in some embodiments and configurations, wires or cables that extend over a designated section of the gas turbine engine 100. The sensor elements 120 may thus be arranged to monitor temperatures and thus potential for overheat and/or fire within such sections of the gas turbine engine 100 (e.g., fire-protected space 114).

As shown in FIG. 1, the fire and overheat detection system 102 may be arranged and configured as a continuous fire and overheat detection system. In this respect, the support elements 122, 124 may include multiple instances to arrange the fire and overheat detection system 102 within and along the fire-protected space 114. Although the fire and overheat detection system 102 is shown as a continuous system in the illustrated embodiment, it is to be understood and appreciated that spot-type fire and overheat detection systems can also benefit from aspects of embodiments of the present disclosure.

As will be appreciated by those of skill in the art in view of the present disclosure, the case 110 of the gas turbine engine 100 communicates heat to the fire-protected space 114 during operation. To detect an overheating of the gas turbine engine 100, the fire and overheat detection system 102 is operably connected to the gas turbine engine 102. The fire and overheat detection system 102 is arranged, at least partially, within the fire-protected space 114 and includes the one or more sensor elements 120 arranged to detect a temperature within the fire-protected space 114. In this illustrative configuration, the support brackets 122 may be connected to or mounted to an exterior surface of the case 110 of the gas turbine engine 100. The fire and overheat detection system 102 may be continuous and extend within and/or through the fire-protected space 114. The sensor elements 120 may be mechanically damped from vibration communicated by the gas turbine engine 100 by the support brackets 122 and/or the support rails 124. The sensor elements 120 are configured to monitor a temperature of the case 110, e.g., via resistivity change of a thermistor body contained within the sensor elements 120.

It will be appreciated that the fire and overheat detection systems are installed on or at key fire hazard areas in an engine or an aircraft auxiliary power unit (APU). In some cases, the locations where these are installed may be exposed to a combination of fluids from the engine/APU and external contaminants that enter the compartment though the various openings in the compartment. These fluids can combine into detrimental mixtures that can result in corrosion to the aircraft and/or the fire detectors installed in the compartment(s) of the engine/APU. In operation the compartments to be monitored may be exposed to, for example and without limitation, fuels, oils, anti-ice fluids, acidic salt fog, and combinations thereof. As such, the fire and overheat detection systems or components thereof may also be subject to exposure to such chemicals and substances. Moreover, the fire and overheat detection systems may be exposed to 500° F. or greater (e.g., 800° F. or greater), and thus high temperature rating may be required.

As noted, the fire and overheat detection systems may include wires that connect to detectors and these wires or the detectors themselves may become corroded by such fluids. The wiring of the fire and overheat detection systems may be operably and electrically connected to a controller or to another sensor/detector in a sensing loop of a fire and overheat detection system. In a given installation, there may be anywhere from one to several detectors connected in series.

In operation, the sensing elements of the fire and overheat detection systems of the present disclosure typically or normally at a high resistance state. When exposed to a fire condition, the resistance of the sensing element decreases as the temperature increases. The resistance of the sensing elements may be preset such that specific temperatures may indicate an alarm threshold temperature. When the alarm threshold temperature is met or exceeded, a connected controller or monitoring electronic system can activate a fire alarm and/or fire suppression system.

The corrosion that can form can bridge the insulating portions of the sensors, causing faulty and/or unnecessary alarms or suppression system activation. For example, the corrosion may bridge across a ceramic separator portion, which can result in a significant resistance drop. This resistance drop caused by the corrosion can appear to the sensor as a resistance drop expected in a fire situation. The change in resistance from corrosion can result in a false alarm or a fault. In aircraft applications, such faults or false alarms may give rise to emergency situations, where an aircraft may be required to land to ensure that no actual fire is present. Accordingly, embodiments of the present disclosure are directed to aircraft fire and overheat detection system having improved sensor protection.

Figure 2:
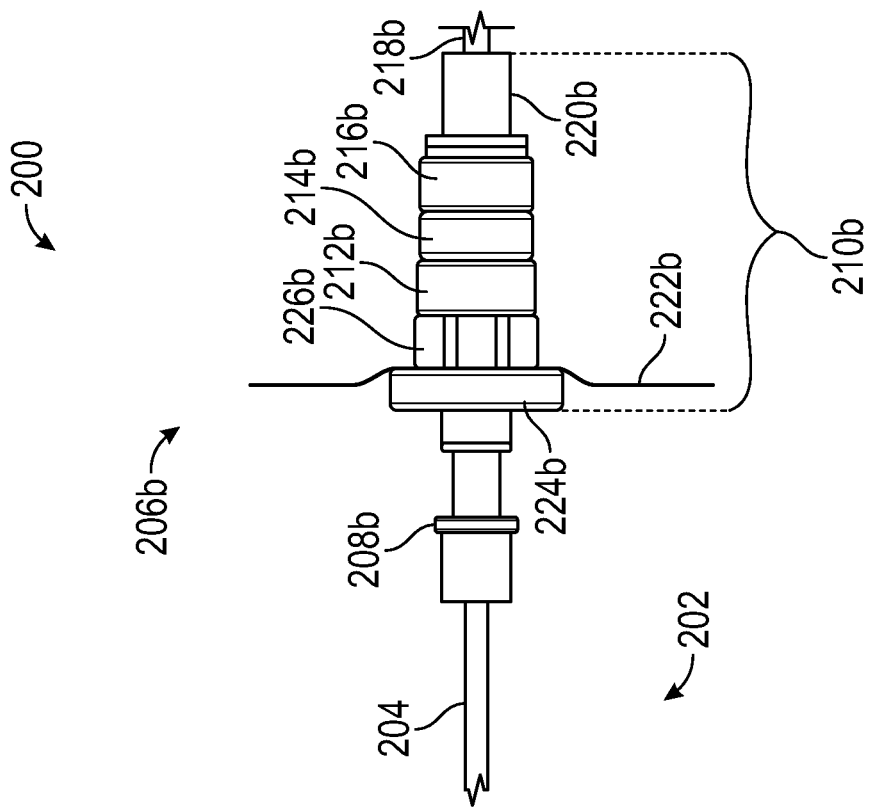
FIG. 2 is a schematic illustration of an aircraft fire and overheat detection system in accordance with an embodiment of the present disclosure.
Figure 2:
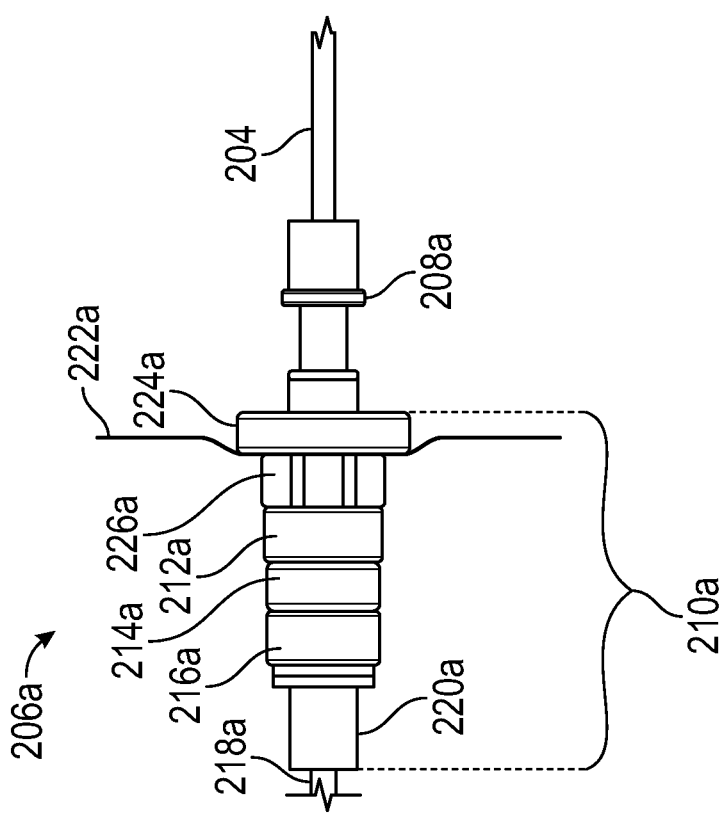

Turning now to FIG. 2, a schematic illustration of an aircraft fire and overheat detection system 200 having a sensor assembly 202 in accordance with an embodiment of the present disclosure is shown. The sensor assembly 202 includes a sensing element 204 that extends between two terminal assemblies 206a, 206b. The sensing element 204 may be a wire or cable, as will be appreciated by those of skill in the art. The terminal assemblies 206a, 206b each include a flange 208a, 208b and a connection assembly 210a, 210b. The connection assembly 210a, 210b of each terminal assembly 206a, 206b includes a threaded barrel 212a, 212b, an insulator 214a, 214b, a terminal cap 216a, 216b, a connection cable 218a, 218b, and a terminal lug 220a, 220b for connecting the connection assembly 210a, 210b to the connection cable 218a, 218b. The connection cable 218a, 218b is configured to electrically and operably connect to a controller, processor, or other system that monitors the electrical properties of the aircraft fire and overheat detection system 200. The terminal lugs 220a, 220b in some configurations can include a screw, nut, and washer, although other connection configurations are possible without departing from the scope of the present disclosure.

The aircraft fire and overheat detection system 200 may be mounted to an aircraft engine structure or other aircraft structure by affixing the aircraft fire and overheat detection system 200 to one or more brackets 222a, 222b. As shown, in this non-limiting embodiment, the connection assemblies 210a, 210b include a mounting head 224a, 224b and a mounting nut 226a, 226b. The brackets 222a, 222b may be arranged between these two components of the connection assemblies 210a, 210b. The mounting nut 226a, 226b of the connection assemblies 210a, 210b may be threaded on the threaded barrel 212a, 212b of each terminal assembly 206a, 206b to secure the terminal assembly 206a, 206b to the brackets 222a, 222b.

In operation, the sensing element 204 is responsive to temperature changes and in such changing temperatures the resistance of electrical current through the sensing element 204 will change. The connection cables 218a, 218b are configured to convey information associated with the change in resistance in order to detect an increase in temperature that may be indicative of an overheat or fire situation. The insulator 214a, 214b is provided to minimize external factors (e.g., conductive fluids or materials) from impacting the sensing capability of the aircraft fire and overheat detection system 200. The insulator 214a, 214b may also provide insulation of an electrical signal from a grounded surface. If a conductive path from the sensing element 204 becomes grounded, false alarms or improper detection may arise, and thus preventing the sensing element 204 from improper grounding is important to ensure proper operation of the aircraft fire and overheat detection system 200. Specifically, for example, it may be preferred to avoid grounding of the terminal cap 216a, 216b and/or the terminal lug 220a, 220b. Exterior grounding (e.g., a sensor outer tube) may be acceptable, as such grounding may not impact the sensing device in a negative manner. However, to avoid false alarms or the like, the interior grounding should be avoided.

For example, if a fluid or liquid passes over the connection assemblies 210a, 210b it can cause corrosion of one or more components of the connection assemblies 210a, 210b. This fluid can cause an electrical bridge or grounding across the insulator 216a, 216b, thus impacting the ability of the connection cables 218a, 218b to detect an accurate resistance of the sensing element 204. This can lead to false alarms or false detection of overheat or fire situations. As such, it may be advantageous to have improved protection of the components of the aircraft fire and overheat detection system 200, and thus improve detection reliability and accuracy.

Embodiments of the present disclosure are directed to aircraft fire and overheat detection systems that include a protective sleeve that is configured to prevent fluids or liquids from causing corrosion to the components of the aircraft fire and overheat detection system. For example, the protective sleeves of the present disclosure are configured to be applied to the terminal assemblies of an aircraft fire and overheat detection system such that the electrical components are protected and environmental impacts on the electrical sensing of such systems may be minimized or eliminated.

Figure 3A:
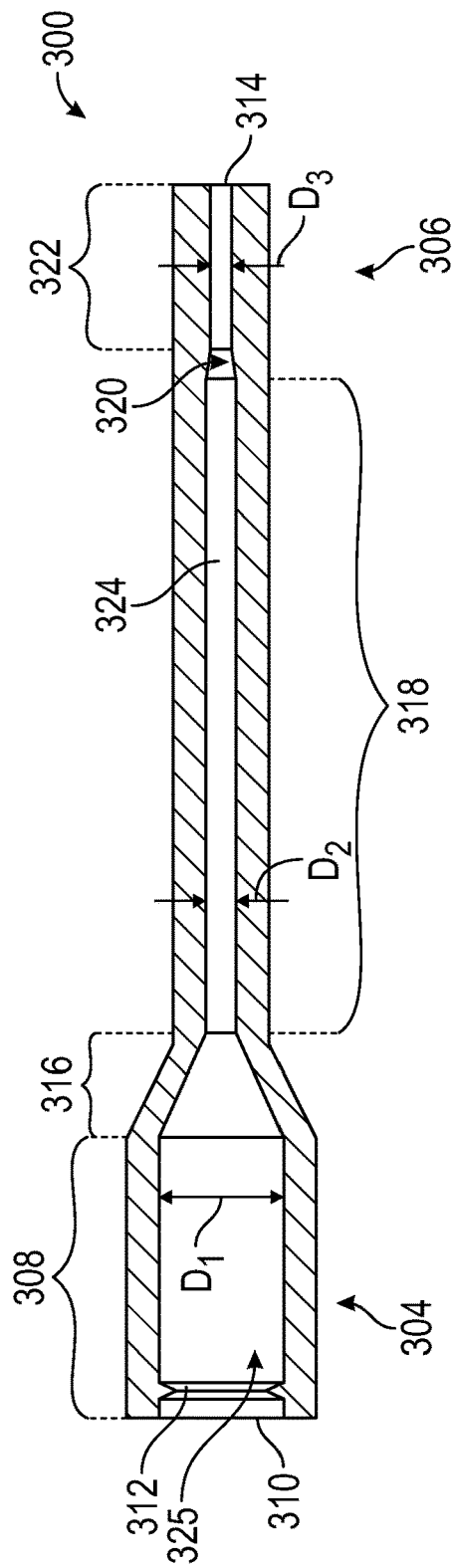
FIG. 3A is a schematic illustration of a protective sleeve for an aircraft fire and overheat detection system in accordance with an embodiment of the present disclosure.
Figure 3B:
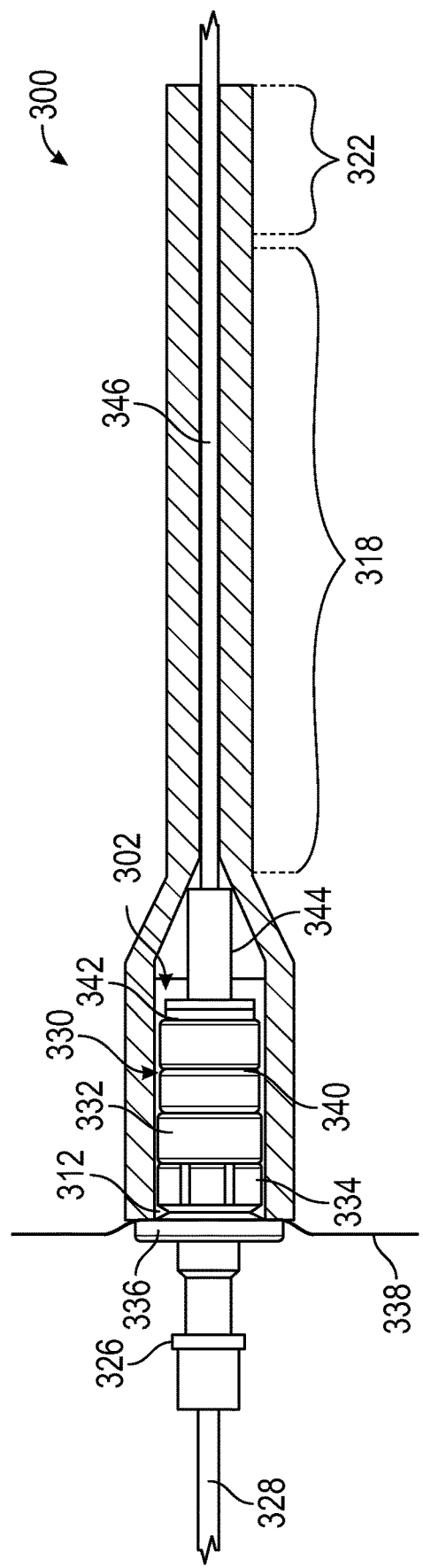
FIG. 3B is a schematic illustration of the protective sleeve of FIG. 3A as applied to a portion of an aircraft fire and overheat detection system in accordance with an embodiment of the present disclosure.

Turning now to FIGS. 3A-3B, schematic illustrations of an embodiment of the present disclosure are shown. FIG. 3A illustrates a protective sleeve 300 for use with an aircraft fire and overheat detection system and FIG. 3B illustrates the protective sleeve 300 as installed to a portion of an aircraft fire and overheat detection system. Specifically, FIG. 3B illustrates the protective sleeve 300 as applied about a portion of a terminal assembly 302 of an aircraft fire and overheat detection system.

The protective sleeve 300 has a substantially tubular shape with a lug portion 304 and a wire portion 306. As shown, the lug portion 304 has a larger or increased diameter or size relative to the wire portion 306. The protective sleeve 300 is made from a material that is capable of withstanding relatively high heats in aircraft engine or aircraft environments and is non-reactive with the components of the terminal assembly 302 of an aircraft fire and overheat detection system. For example, materials of the protective sleeve 300 can include, without limitation, polyolefin, fluoropolymer, polyvinyl chloride (PVC), polychloroprene (neoprene), silicone elastomer, etc. The material may be selected for resiliency and elasticity in order to provide a tight and secure forming fit about components of the terminal assembly 302 of an aircraft fire and overheat detection system. The material of the protective sleeves of the present disclosure may be selected to withstand temperatures in excess of 500° F. In some embodiments, the material may be selected to withstand temperatures of 800° F. or greater, and still further, in some embodiment, the material may be selected to withstand temperatures of 2,000° F. In other embodiments, the material may be selected as a sacrificial element that will be destroyed in the event of an actual fire or high temperature event. That is, the material may be selected to protect and maintain such protection during normal operation and normal operational temperatures but may be sacrificed in the event of an actual fire or overheat event. The material is thus selected to survive and protect the components of the sensor during normal operation to avoid false activation and/or grounding of the sensor components that are protected by the protective sleeve 300.

The protective sleeve 300 includes a lug area 308 at the lug portion 304 that is an interior cavity or region that is sized and shaped to receive various components of the terminal assembly 302 of an aircraft fire and overheat detection system. The lug portion 304 has a first inner diameter $D_1$ that is sized and shaped to receive the components of the terminal assembly 302. Proximate a first end 310 of the protective sleeve 300, of the lug portion 304, is a sealing protrusion 312. The sealing protrusion 312, in this non-limiting embodiment, is a V-shaped structure that extends radially inward from an interior surface of the lug portion 304 of the protective sleeve 300. It will be appreciated that in other embodiments, the sealing protrusion 312 may have other geometric profiles, such as rounded, squared, multiple ridges, and the like, without departing from the scope of the present disclosure. The geometric shape of the sealing protrusion 312 may be selected to ensure and optimize a sealing contact between the protective sleeve and the terminal assembly 302 in the lug portion 304. The sealing protrusion 312 defines a section of the lug portion 304 that has a reduced diameter proximate the first end 310 of the protective sleeve 300.

In a direction from the first end 310 (e.g., lug portion 304) toward a second end 314 (e.g., wire portion 306) is a first transition portion 316. The first transition portion 316 is a tapering structure that reduces the diameter of the protective sleeve 300 in a direction from the first end 310 toward the second end 314. Specifically, the first transition portion 316 defines a tapering diameter from the first diameter $D_1$ of the lug portion 304 to a second diameter $D_2$ of a first wire portion 318. The tapering dimensions of the first transition portion 316 may has a size and axial length to accommodate hardware that secures a connection wire/cable to a lug or other component of the terminal assembly 302. The first wire portion 318 is configured to fit about, and contact, an exterior surface of a connection cable of the terminal assembly 302.

The first wire portion 318 is followed by a second transition portion 320. The second transition portion 320 is a tapering structure that reduces the diameter of the protective sleeve 300 in a direction from the first end 310 toward the second end 314. Specifically, the second transition portion 320 defines a tapering diameter from the second diameter $D_2$ of the first wire portion 308 to a third diameter $D_3$ of a second wire portion 322, which extends to the second end 314 of the protective sleeve 300. The third diameter $D_3$ is sized to provide an interference fit with a portion of an exterior surface of a connection cable of the terminal assembly 302, as described below. In additional to the mechanical fit and surrounding of the components of the terminal assembly 302, the protective sleeve 300 can include an optional adhesive sealant on a portion or the entire interior surface 324. The adhesive sealant can be, for example and without limitation, hot-melt, silicone, elastomers, epoxy, etc.

The protective sleeve 300 defines an interior bore 325 that is open at the first end 310 and the second end 314 with a continuous bore or cavity extending between the two ends 310, 314. The interior bore 325 is sized and shaped to receive the terminal assembly 302 and the components thereof. The described diameters $D_1$, $D_2$, $D_3$ and the transition portions 316, 320 reflect the interior shape and size of the protective sleeve 300.

FIG. 3B illustrates the terminal assembly 302 as installed within the protective sleeve 300. As shown, the terminal assembly 302, similar to that shown and described above, includes a flange 326 connected to a sensing element 328 and a connection assembly 330. The connection assembly 330 includes a threaded barrel 332, a mounting nut 334 threaded onto the threaded barrel 332 that combines with a mounting head 336 to connect to a bracket 338, an insulator 340, a terminal cap 342, a terminal lug 344, and a connection cable 346. The majority of the components of the connection assembly 330 fit within the lug portion 304 of the protective sleeve 300. The first transition portion 316 fits about the terminal lug 344 and reduces to the second diameter $D_2$ where the connection cable 346 extends from the terminal lug 344. In some embodiments, the protective sleeve 300 may be heat shrinkable about the components of the terminal assembly 302. As such, a pre-installation size/dimension of the protective sleeve 300 may be sized to fit or slide over the terminal assembly 302, and then heat is applied to shrink or form-fit the protective sleeve 300 about the terminal assembly 302. The heat application may cause the end result of a bonding form-fitting or a reduced diameter protective sleeve that forms essentially an interference fit with the exterior surfaces of one or more of the components of the terminal assembly 302.

Along the length of the first wire portion 318, the interior surface 324 of the protective sleeve 300 will contact and bond with the exterior surface of the connection cable 346. In some embodiments, the interior surface 324 may include an adhesive sealant, as discussed above, which aids in the bonding of the protective sleeve 300 to the terminal assembly 302. For example, such adhesive sealant can, in some embodiments, enable the bonding of the protective sleeve 300 to the connection cable 326. Further, in some embodiments, the second diameter $D_2$ may be sized to provide an interference fit with the connection cable 346. Toward the second end 314 of the protective sleeve 300, the second transition portion 320 reduces the diameter of the interior bore 325 to the third diameter $D_3$ such that a greater interference fit between the protective sleeve 300 and the connection cable 346 is achieved. In some embodiments, the second diameter $D_2$ may be selected to be about the same size/diameter as an external diameter of the connection cable 346 and the third diameter $D_3$ may be selected to be less than the size/diameter as an external diameter of the connection cable 346.

As shown in FIG. 3B, the sealing protrusion 312 is positioned and captured between the bracket 338 and the mounting nut 334 threaded onto the threaded barrel 332. The sealing protrusion 312 is a protrusion of the material of the protective sleeve 300 that can be captured or pressed between the mounting nut 334 and the surface of the bracket 338. The material of the sealing protrusion 312 provides for a complete fluid seal at the first end 310 and prevents fluid or liquid intrusion into the interior bore 325 of the protective sleeve and thus prevents any such fluid or liquid from compromising the electrical stability and functionality of the aircraft fire and overheat detection system.

Advantageously, embodiments of the present disclosure provide for improved aircraft fire and overheat detection systems having protection from the environmental conditions when operated onboard an aircraft. Due to the nature of the location necessary for aircraft fire and overheat detection systems on aircraft, the components thereof may be subject to high vibrations, chemical exposures, and drastic temperature changes. These environmental conditions can lead to corrosion or other damage or impact to aircraft fire and overheat detection systems. Embodiments of the present disclosure provide for a protective sleeve that protects the components of the aircraft fire and overheat detection system in such harsh conditions.

As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. An aircraft fire and overheat detection system, comprising:
   a support bracket configured to secure the aircraft fire and overheat detection system to a component of an aircraft;
   a terminal assembly fixedly connected to the support bracket, the terminal assembly comprising a connection assembly and a connection cable;
   a sensing element electrically connected to the terminal assembly and arranged to detect at least one of fire and heat associated with the component of the aircraft, wherein the connection cable is electrically connected to the sensing element to enable detection of an electrical resistance in the sensing element; and
   a protective sleeve arranged about the connection assembly and connection cable, the protective sleeve comprising a first end having an opening and a second end having an opening and an interior bore extending between the openings at the first and second ends, wherein:
      a lug portion is arranged at the first end and includes a sealing protrusion extending radially inward within the interior bore, the lug portion having a first diameter,
      a first wire portion having a second diameter that is less than the first diameter and extending toward the second end, and a second wire portion arranged at the second end, the second wire portion having a third diameter that is less than the second diameter.

2. The aircraft fire and overheat detection system of claim 1, wherein the protective sleeve is made from at least one of polyolefin, fluoropolymer, polyvinyl chloride (PVC), polychloroprene (neoprene), and silicone elastomer.

3. The aircraft fire and overheat detection system of claim 1, further comprising an adhesive sealant applied to a surface of the interior bore.

4. The aircraft fire and overheat detection system of claim 3, wherein the adhesive sealant is applied at least to the first wire portion.

5. The aircraft fire and overheat detection system of claim 3, wherein the adhesive sealant is applied at least to the second wire portion.

6. The aircraft fire and overheat detection system of claim 3, wherein the adhesive sealant is at least one of hot-melt, silicone, elastomer, and epoxy.

7. The aircraft fire and overheat detection system of claim 1, wherein the terminal assembly includes a mounting nut threaded onto a threaded barrel and a mounting head wherein a portion of the support bracket is secured between the mounting nut and the mounting head.

8. The aircraft fire and overheat detection system of claim 7, wherein the sealing protrusion sealingly engages between the threaded nut and the portion of the support bracket.

9. The aircraft fire and overheat detection system of claim 1, wherein the third diameter is less than an external diameter of the connection cable.

10. The aircraft fire and overheat detection system of claim 1, wherein the second diameter is substantially equal to an external diameter of the connection cable.

11. The aircraft fire and overheat detection system of claim 1, wherein the protective sleeve comprises a first transition portion defining a tapering diameter between the lug portion and the first wire portion.

12. The aircraft fire and overheat detection system of claim 1, wherein the protective sleeve comprises a second transition portion defining a tapering diameter between the first wire portion and the second wire portion.

13. An aircraft comprising:
a fire-protected space; and
an aircraft fire and overheat detection system, comprising:
a support bracket configured to secure the aircraft fire and overheat detection system within the fire-protected space;
a terminal assembly fixedly connected to the support bracket, the terminal assembly comprising a connection assembly and a connection cable;
a sensing element electrically connected to the terminal assembly and arranged to detect at least one of fire and heat associated with the component of the aircraft, wherein the connection cable is electrically connected to the sensing element to enable detection of an electrical resistance in the sensing element; and
a protective sleeve arranged about the connection assembly and connection cable, the protective sleeve comprising a first end having an opening and a second end having an opening and an interior bore extending between the openings at the first and second ends, wherein:
a lug portion is arranged at the first end and includes a sealing protrusion extending radially inward within the interior bore, the lug portion having a first diameter,
a first wire portion having a second diameter that is less than the first diameter and extending toward the second end, and
a second wire portion arranged at the second end, the second wire portion having a third diameter that is less than the second diameter.

14. The aircraft of claim 13, wherein the fire protected space is located within a portion of an engine of the aircraft.

15. The aircraft of claim 13, wherein the protective sleeve is made from at least one of polyolefin, fluoropolymer, polyvinyl chloride (PVC), polychloroprene (neoprene), and silicone elastomer.

16. The aircraft of claim 13, further comprising an adhesive sealant applied to a surface of the interior bore.

17. The aircraft of claim 13, wherein the terminal assembly includes a mounting nut threaded onto a threaded barrel and a mounting head wherein a portion of the support bracket is secured between the mounting nut and the mounting head.

18. The aircraft of claim 13, wherein the third diameter is less than an external diameter of the connection cable.

19. The aircraft of claim 13, wherein the second diameter is substantially equal to an external diameter of the connection cable.

20. The aircraft of claim 13, wherein the protective sleeve comprises a first transition portion defining a tapering diameter between the lug portion and the first wire portion and a second transition portion defining a tapering diameter between the first wire portion and the second wire portion.

* * * * *